United States Patent [19]

Pohlman et al.

[11] 4,410,604

[45] Oct. 18, 1983

[54] IRON-BASED BRAZING ALLOY COMPOSITIONS AND BRAZED ASSEMBLIES WITH IRON BASED BRAZING ALLOYS

[75] Inventors: Matthew J. Pohlman, Huntington Beach; Lynn E. Kindlimann, Woodland Hills, both of Calif.

[73] Assignee: The Garrett Corporation, Los Angeles, Calif.

[21] Appl. No.: 321,950

[22] Filed: Nov. 16, 1981

[51] Int. Cl.³ .................... C22C 38/32; C22C 38/34
[52] U.S. Cl. .................... 428/681; 75/128 C; 75/128 F; 420/581; 420/582; 420/583
[58] Field of Search .............. 75/128 C, 128 F, 125, 75/128 R; 428/681; 420/581, 582, 583, 584

[56] References Cited

U.S. PATENT DOCUMENTS

| | | | |
|---|---|---|---|
| 1,804,237 | 5/1931 | Steenstrup | 428/681 |
| 2,645,006 | 7/1953 | Hadley | 428/681 |
| 2,864,693 | 12/1958 | Cape et al. | 75/125 |
| 2,932,887 | 9/1958 | McCuaig et al. | 428/681 |
| 3,147,089 | 7/1961 | Chyle | 228/263 |
| 3,177,577 | 4/1965 | Fujimura et al. | 75/128 R |
| 3,717,442 | 2/1973 | Knopp | 75/255 |
| 3,726,668 | 4/1973 | Lank | 75/128 C |
| 3,726,668 | 4/1973 | Baümel et al. | 75/128 C |
| 3,836,358 | 9/1974 | Jones | 75/128 C |
| 3,892,541 | 7/1975 | Jones et al. | 75/128 C |
| 3,900,316 | 8/1975 | Jones | 75/128 C |
| 3,980,444 | 9/1976 | Reen | 75/128 F |
| 4,012,227 | 3/1977 | Jones et al. | 75/128 C |
| 4,014,680 | 3/1977 | Reen | 75/128 F |
| 4,035,159 | 7/1977 | Hashimoto et al. | 75/128 C |
| 4,075,392 | 2/1978 | Jaeger | 428/682 |
| 4,160,066 | 7/1979 | Szumachowski et al. | 228/263 |
| 4,174,213 | 11/1979 | Fukui | 75/128 C |

*Primary Examiner*—L. Dewayne Rutledge
*Assistant Examiner*—Debbie Yee
*Attorney, Agent, or Firm*—Joseph A. Yanny; Donald W. Canady; Albert J. Miller

[57] ABSTRACT

An economical brazing alloy composition includes high amounts of iron. A brazed assembly includes iron-based brazing alloys.

6 Claims, No Drawings

IRON-BASED BRAZING ALLOY COMPOSITIONS AND BRAZED ASSEMBLIES WITH IRON BASED BRAZING ALLOYS

BACKGROUND OF THE INVENTION

The present invention relates to an economical iron-based brazing alloy composition which allows for more economical fabrication of brazed assemblies such as heat exchangers. The present invention also relates to brazed assemblies with iron-based brazing alloys.

The need to produce brazed assemblies and in particular heat exchangers in a manner which minimizes cost of materials and yet obtains products which match or exceed the properties and capabilities of assemblies made with yesterday's technology has become overly apparent in recent years. Particularly desirable, yet problematic, in the heat exchanger fabrication business is the need to eliminate the large amounts of nickel required for most braze alloy compositions and to replace the nickel with a more economical substitute.

Plate-fin heat exchangers use significant amounts of braze alloy for fabrication by furnace brazing. These alloys typicaly contain greater than 60% nickel. Substitution of iron for nickel could result in significant raw material cost savings making possible savings which may be passed on to the consumer. Substitution is, however, not a routine matter as iron has a higher melting point than nickel, tending to raise brazing temperatures above practical furnace limits and also tending to weaken the parent elements of the heat exchanger. Also, the combination of iron fillers on iron metals, e.g., stainless steels, can lead to severe erosion problems of the parent metal, typically referred to as burn-through.

Accordingly, the present invention contemplates provision of a braze alloy in which the filler is substantially iron with additions of chromium and/or nickel for improved high temperature service, and carbon, boron and silicon for melting point depression. The carbon level is maintained low to prevent erosive burn-through of the parent or structural member when joined by furnace brazing in a protective atmosphere. A brazing temperature of less than 2100° Fahrenheit, although 2200° F. is tolerable, has been achieved while at the same time achieving the desired objective of reduced raw material costs compared to conventional nickel-based filler metals.

Accordingly, the present invention also contemplates provision of a brazed assembly having an iron-based brazing alloy.

DETAILED DESCRIPTION OF THE PREFERRED EMBODIMENT

The present invention is particularly designed for use in the manufacture of heat exchangers and accordingly contemplates a braze alloy which is compatible with the light gauge steel plates and fins typically found in heat exchanger applications.

Accordingly, the present invention contemplates the use of a braze alloy which is substantially iron-based having additions of chromium and nickel for improved high temperature service and also to lower the melting point so as to avoid excessive high temperature fabrication requirements thereby alleviating parent metal weakening and easily staying within the practical temperature limits of most existing braze furnaces. Additionally, carbon, boron and/or silicon are added to the braze alloy mixture to depress the melting point thereof even lower. This allows energy cost savings during fabrication, and as previously mentioned, also allows for maintenance of strong parent metal elements by eliminating the need for extreme high temperatures.

While the presence of carbon in the braze alloy aids in the use of the braze alloy of the present invention, in excessive amounts it is detrimental in that it tends to promote erosion or dissolution of the parent or structural member. Therefore, ideally, the braze alloy of the present invention would include a maximum weight percent of 0.5% carbon, and in the preferred embodiment the carbon level would be substantially below 0.1%.

The nickel content of the braze alloy of the present invention is ideally maintained at very low levels so as to maintain the cost of the composition within the target range. While as high as 40% by weight nickel is contemplated as part of the present invention preferably the nickel range will not exceed 22% nor be less than 18% by weight. This reduced nickel content allows for substantial initial wetting of the braze alloy due to the low melting point of nickel while at the same time minimizing the cost of braze alloy filler materials.

Chromium is a desirable element for inclusion in braze alloy composition in that it tends to protect the metal structural elements of the finished product brazed assembly from the corrosive environments of usage. It is, however, not essential for all applications and the present invention contemplates a maximum inclusion of chromium in the braze alloy composition of 20 weight percent. The chromium level, however, may vary from 0 to 20% by weight. Boron which was previously mentioned as included in the braze alloy composition as a desirable element from the standpoint of melting point depression may vary from 0 to 5% by weight.

In a similar vein, silicon may be included to depress the melting point to a level which is tolerable and according to the present invention may be included in the braze alloy composition of the present invention in amounts of from 0 to 12 weight percent.

The balance of the braze alloy composition is substantially iron thereby providing a braze alloy which has a flow temperature of less than 2200° F. and ideally less than 2100° Fahrenheit and provides a significantly reduced raw material cost compared to conventional nickel braze. As is well known in the published brazing art, the brazing temperature is typically somewhat above the melting point and the flow temperature of the braze filler alloy. The minimum brazing temperature then becomes the flow temperature as determined by standard metallurgical tests, but in practice, brazing temperatures are often above the flow temperature to account for the size and nature of the article to be brazed and brazing cycle parameters, e.g. the rate of heating, the environment, etc. If possible, the iron content of the braze alloy of the present invention should include at least 50 weight percent iron and only in very rare instances should the amount of nickel exceed the amount of iron. The preferred range of iron is 60 to 70 weight percent. Trace elements of substances such as titanium and manganese may be included in the braze alloy of the present invention These elements are included on a specific basis and accordingly many modifications can be made to the composition to suit it to a specific application.

The braze alloy of the pesent invention is usable in essentially any inert protective environment. The recommended preferred protective environment, which was the one used during the course of the following tests, is dry hydrogen.

In summary, the preferred brazing alloy of the present invention includes: at least 50 and ideally between 60 and 70 weight percent iron; a maximum of 40, but ideally between 18 and 22 weight percent nickel; a maximum of 20 weight percent chromium; a maximum of 0.5, but ideally less than 0.1 weight percent carbon; a maximum of 5 weight percent boron; and a maximum of 12 weight percent silicon.

A brazed assembly according to the present invention includes an iron-based braze alloy according to the present invention to join the elements thereof.

EXAMPLE I

To reach the objectives of a lower cost filler for braze alloys for heat exchanger fabrication and to obtain low parent metal erosion during brazing, iron-based materials were prepared by Alloy Metals Inc. (AMI) to specification and tested. Brazing tests were conducted in a dry hydrogen protective environment over the range of temperatures of from 2025 to 2100° Fahrenheit. The results and chemical makeup of the test material are shown below in Table I.

TABLE I

| Lot # | C | Cr | Si | B | Ni | Fe | Results |
|---|---|---|---|---|---|---|---|
| 282 | — | 8.31 | 4.10 | 3.81 | — | Bal. | Did not melt at 2025° F. |
| 299 | — | — | 4.2 | 3.2 | — | " | Did not melt at 2025° or 2090° F. |
| 525 | — | — | 10.5 | 3.6 | — | " | Melted but did not flow at 2100° F. |
| 526 | 4.0 | 14.3 | — | 4.0 | 19.3 | " | Melted but did not flow at 2100° F.; severely eroded 409 base metal. |
| 527 | 4.0 | 12 | — | 3.0 | 20 | " | Melted but did not flow at 2100° F.; severely eroded 409 base metal. |

EXAMPLE II

From the tests conducted with respect to Example I it was apparent that the braze alloys designated by lot numbers 282 through 527 as shown therein above were unsatisfactory in and of themselves and that further refinement of the composition would be required. Standard tests within the same temperature range were conducted on standard nickel base alloys available in the market, i.e. AMS 4777 (AMI 770 HB Lot 3907), Coast Metal 59 (Lot 4308), and AMI 300 (Lot 2223). The protective environment was again dry hydrogen and the braze test temperature was 2,025° F. Predictably, the high nickel content alloys performed sufficiently to make them probable candidates for blending with the other alloys of Table I to achieve a viable braze alloy within the confines of the present invention. The overall chemical makeup of the high nickel content alloys is shown and depicted in Table II herein below.

TABLE II

| Components | C | Cr | Si | B | Ni | Fe | Other | Result (2025° F.) |
|---|---|---|---|---|---|---|---|---|
| AMS 4777 Lot 3907 | .02 | 7 | 4.5 | 3.5 | 82 | 3.0 | — | o.k. |
| Coast Metal 59 Lot 4308 | .08 | — | 4.19 | 3.17 | 91.8 | — | 0.75 Ti | o.k. |
| AMI 300 Lot 2223 | .034 | 19.61 | 9.93 | — | 60.6 | — | 9.86 Mn | o.k. |

EXAMPLE III

As a result of the tests which were conducted in Examples I and II, additional tests were run in an attempt to further narrow the ranges of elements to be included in the braze alloy composition. Various amounts of the basic compounds from Examples I and II were blended as powders and placed on type 409 stainless steel plate-fin sandwiches of the type used in certain heat exchangers, and found to be acceptable or non-acceptable as indicated below in Table III. The specific chemical composition is given below in Table III together with the results which were obtained during the course of the test. The brazing temperature for the Example III mixtures was approximately 2,025° F. and the temperature was held for 10 minutes. The protective environment was again dry hydrogen.

TABLE III

| Components | C | Cr | Si | B | Ni | Fe | Other | Result |
|---|---|---|---|---|---|---|---|---|
| 4777, lot 3907 control | .02 | 7 | 4.5 | 3.5 | 82 | 3.0 | — | o.k. |
| lot 282 only | — | 8.31 | 4.1 | 3.81 | — | 83.8 | — | not melted |
| 90% 282 + 10% 4308 | .01 | 7.48 | 4.11 | 3.75 | 9.2 | 75.42 | 0.07 Ti | not melted |
| 50% 282 + 50% 4308 | .04 | 4.16 | 4.15 | 3.49 | 45.9 | 41.9 | 0.38 Ti | melted w/ little flow |
| 90% 282 + 10% 3907 | — | 8.18 | 4.14 | 3.78 | 8.2 | 75..72 | — | not melted |
| 75% 282 + 25% 3907 | .005 | 7.98 | 4.2 | 3.73 | 20.5 | 63.6 | — | not melted |

TABLE III-continued

| Components | Overall Chemistry in Weight Percent | | | | | | | Result |
|---|---|---|---|---|---|---|---|---|
| | C | Cr | Si | B | Ni | Fe | Other | |
| 50% 282 + 50% 3907 | .01 | 7.66 | 4.3 | 3.66 | 41.0 | 43.4 | — | melted w/ little flow |
| 75% 282 + 25% 2223 | .01 | 11.14 | 5.56 | 2.86 | 15.2 | 62.8 | 2.47 Mn | not melted |
| 50% 282 + 50% 2223 | .02 | 13.96 | 7.02 | 1.91 | 30.3 | 41.9 | 4.93 Mn | melted w/ little flow |

EXAMPLE IV

As a result of the data gathered during the tests of Examples I, II and III it was possible to estimate the median quantities of elements to be included in the iron-based brazing alloy. Various amounts of the basic compounds from Examples I and II were blended, and again placed on type 409 stainless steel plate-fin sandwiches and found to be acceptable both from the standpoint of melting and flowing at a braze temperature of 2,080° F. The specific chemical compositions are given below in Table IV for these two blended mixtures which achieved desirable results. Again, a protective environment of dry hydrogen was used.

TABLE IV

| Combination | Overall Chemistry in Weight Percent | | | | | | Results |
|---|---|---|---|---|---|---|---|
| | C | Cr | Si | B | Ni | Fe | |
| 75% lot 525 + 25% EM 4777 | 0.01 | 1.87 | 9.1 | 3.55 | 20.4 | 65.1 | Satisfactory |
| 25% lot 525 + 50% lot 282 + 25% EM 4777 | 0.01 | 5.6 | 5.78 | 3.63 | 20.4 | 64.6 | Satisfactory |

It is hypothesized that the present of the lower melting point 4777 in each case as depicted in Table IV helped to promote initial flow of the material. The total chemistry balance as depicted therein was necessary to achieve proper brazing. The results obtained from Example IV allowed for further refinement of the elemental composition of desired braze alloys according to the present invention.

EXAMPLE V

In an attempt to broader the range of elements included in the braze alloy about the medians established in Example IV, further testing was done again in a dry hydrogen protective environment at a temperature of 2,080° F. Homogeneous powders having generally the composition shown below in Table V were obtained from Glidden Metals to specification and tested. Total chemistry balance as depicted in Table V together with the results obtained from the test of each heat 1 through 4 are shown below in Table V.

TABLE V

| Heat No. | Overall Chemistry in Weight Percent | | | | | | | Results |
|---|---|---|---|---|---|---|---|---|
| | C | Cr | Si | B | Ni | Fe | Other | |
| 1. | 0.06 | 2.1 | 9.2 | 2.4 | 21.6 | 64.7 | — | melted & flowed |
| 2. | 0.06 | 5.4 | 5.8 | 3.1 | 21.1 | 65.3 | — | melted & flowed |
| 3. | 0.03 | 0.3 | 10.8 | 3.7 | 0.2 | 85.6 | — | partially melted; did not flow |
| 4. | 0.03 | 7.9 | 4.3 | 3.9 | 0.1 | 85.3 | — | partially melted; did not flow |

It will be apparent to those skilled in the art that the novel composition and brazed assembly of the present invention as disclosed herein in connection with the specific examples thereof will suggest various other modifications and applications of the same. It is accordingly desired in construing the breadth of the appended claims that they should not be limited to the specific examples of the invention described herein.

Wherein we claim:

1. An iron-based brazing filler alloy composition characterized by a flow temperature of under 2,200 degrees F., consisting essentially of: 15 to 40 weight percent nickel; 2 to 20 percent chromium; 2 to 5 weight percent boron; 5 to 12 weight percent silicon; a maximum of 0.5 weight percent carbon; and at least 50 weight percent iron.

2. A brazed article including light-gauge steel members joined together with the iron-based brazing filler alloy of claim 1.

3. A brazed article including light-gauge stainless steel members joined together with the iron-based brazing filler alloy of claim 1 at a braze temperature of under about 2200 degrees F.

4. An iron-based brazing filler alloy composition characterized by a flow temperature of under about 2,100 degrees F., consisting essentially of 60 to 70 weight percent iron; 18 to 22 weight percent nickel; 2 to 10 weight percent chromium; 2 to 5 weight percent boron; 5 to 12 weight percent silicon, and a maximum of 0.1 weight percent carbon.

5. The filler alloy composition of claim 4, having 2 to 5% Cr and wherein the sum of the silicon content and the boron content is from 8 to 15%.

6. An iron-based brazing filler alloy composition characterized by a braze temperature of under about 2,080 degrees F., consisting essentially of about 21 weight percent nickel; 2 to 5 weight percent chromium; 2 to 5 weight percent boron; 5 to 12 weight percent silicon; a maximum of 0.1 weight percent carbon; and about 65 weight percent iron.

* * * * *

UNITED STATES PATENT AND TRADEMARK OFFICE
CERTIFICATE OF CORRECTION

PATENT NO. : 4,410,604
DATED : October 18, 1983
INVENTOR(S) : Matthew J. Pohlman and Lynn E. Kindlimann It is certified that error appears in the above-identified patent and that said Letters Patent are hereby corrected as shown below:

Col. 2, line 47, change "nickel braze." to read

--nickel based braze alloys.--

Signed and Sealed this

Third Day of January 1984

[SEAL]

Attest:

GERALD J. MOSSINGHOFF

Attesting Officer     Commissioner of Patents and Trademarks